(12) United States Patent
Berkei et al.

(10) Patent No.: US 8,257,677 B2
(45) Date of Patent: Sep. 4, 2012

(54) DISPERSION METHOD

(76) Inventors: Michael Berkei, Haltern am See (DE); Ulrich Nolte, Kleve (DE); Thomas Sawitowski, Essen (DE); Wolfgang Pritschins, Wesel (DE)

( * ) Notice: Subject to any disclaimer, the term of this patent is extended or adjusted under 35 U.S.C. 154(b) by 449 days.

(21) Appl. No.: 12/514,718

(22) PCT Filed: Sep. 20, 2007

(86) PCT No.: PCT/EP2007/008193
§ 371 (c)(1),
(2), (4) Date: May 26, 2009

(87) PCT Pub. No.: WO2008/058589
PCT Pub. Date: May 22, 2008

(65) Prior Publication Data
US 2010/0059720 A1    Mar. 11, 2010

(30) Foreign Application Priority Data

Nov. 14, 2006 (DE) .......................... 10 2006 053 816
Nov. 21, 2006 (DE) .......................... 10 2006 055 106

(51) Int. Cl.
*H01B 1/24* (2006.01)
(52) U.S. Cl. ..................... 423/445 B; 252/500; 252/502; 252/510; 252/511; 423/445 R; 423/461; 977/742; 977/745; 977/750; 977/752; 977/901
(58) Field of Classification Search ......... 252/500–517.1; 423/445 R–447.3, 461, 445 B; 977/742, 977/745, 750, 752, 842, 847, 901
See application file for complete search history.

(56) References Cited

U.S. PATENT DOCUMENTS

| | | | |
|---|---|---|---|
| 4,795,796 A | 1/1989 | Haubennestel et al. | 528/28 |
| 4,942,213 A | 7/1990 | Haubennestel et al. | 528/28 |
| 5,151,218 A | 9/1992 | Haubennestel et al. | 252/351 |
| 7,906,043 B2 * | 3/2011 | Connell et al. | 252/502 |
| 2004/0136894 A1 * | 7/2004 | Yoshizawa et al. | 423/447.2 |
| 2004/0262581 A1 * | 12/2004 | Rodrigues | 252/500 |
| 2005/0025694 A1 * | 2/2005 | Zhang et al. | 423/447.1 |
| 2005/0250927 A1 | 11/2005 | Pritschins et al. | 528/44 |
| 2006/0040832 A1 * | 2/2006 | Zhang et al. | 508/113 |
| 2006/0069199 A1 * | 3/2006 | Charati et al. | 524/496 |
| 2006/0124028 A1 * | 6/2006 | Huang et al. | 106/31.92 |
| 2006/0188723 A1 * | 8/2006 | Rowley et al. | 428/408 |
| 2006/0278579 A1 * | 12/2006 | Choi et al. | 210/634 |

FOREIGN PATENT DOCUMENTS

| | | |
|---|---|---|
| EP | 0 270 126 A2 | 6/1988 |
| EP | 0 318 999 A2 | 6/1989 |
| EP | 0 417 490 A2 | 3/1991 |
| EP | 1 359 121 A2 | 11/2003 |
| EP | 1 593 700 A1 | 11/2005 |
| JP | 2005-089738 A * | 4/2005 |
| JP | 2005089738 | 4/2005 |
| JP | 2007169120 | 7/2007 |
| WO | WO 2007/011369 A2 | 1/2007 |

OTHER PUBLICATIONS

English translation of the IPRP from PCT/EP2007/008193, 7 pgs.

* cited by examiner

*Primary Examiner* — Mark Kopec
*Assistant Examiner* — Tri V Nguyen
(74) *Attorney, Agent, or Firm* — Brannon Robinson Sowers Hughel & Doss PC

(57) ABSTRACT

The invention relates to a method of dispersing carbon nanotubes (CNTs) in a continuous phase, especially in at least one dispersion medium, the carbon nanotubes, especially without prior pretreatment, being dispersed in a continuous phase, especially in at least one dispersion medium, in the presence of at least one dispersant (dispersing agent), with introduction of an energy input sufficient for dispersing, and also to the dispersions that are obtainable in this way, and to their use. With the method of the invention it is possible for the carbon nanotubes (CNTs) to be dispersed in high concentrations and with high storage stability.

13 Claims, 7 Drawing Sheets

DISPERSION METHOD

CROSS REFERENCES TO RELATED APPLICATIONS

This application is a National Stage filing of International Application PCT/EP2007/008193, filed Sep. 20, 2007, claiming priority to German Application No. DE 10 2006 053 816.1, filed Nov. 14, 2006, and German Application No. DE 10 2006 055 106.0, filed Nov. 21, 2006. The subject application claims priority to PCT/EP2007/008193 and to German Application Nos. DE 10 2006 053 816.1 and DE 10 2006 055 106.0, which references are expressly incorporated by reference herein, in their entirety.

BACKGROUND OF THE INVENTION

The present invention relates to a method of dispersing carbon nanotubes (CNTs) in a continuous phase, especially in at least one dispersion medium, and also to the dispersions themselves that are obtainable in this way, and to their use.

Carbon nanotubes (CNTs for carbon nanotubes) are microscopically small tubular structures (i.e., molecular nanotubes) of carbon. Their walls—like those of the fullerenes or like the planes of graphite—are composed essentially exclusively of carbon, the carbon atoms occupying a honeycomblike structure with hexagons and with three bond partners in each case, this structure being dictated by the $sp^2$ hybridization of the carbon atoms.

Carbon nanotubes derive accordingly from the carbon planes of graphite which have, so to speak, been rolled up to form a tube: The carbon atoms form a honeycomblike hexagonal structure and three bond partners in each case. Tubes with an ideally hexagonal structure have a uniform thickness and are linear; also possible, however, are bent or narrowing tubes which contain pentagonal carbon rings. Depending on the way in which the honeycomb network of the graphite is rolled to form a tube ("straight" or "oblique"), there are helical (i.e., wound in the manner of a screw) and also non-mirror-symmetric structures, i.e., chiral structures.

A distinction is made between single-wall carbon nanotubes (SWCNTs or SWNTs) and multiwall carbon nanotubes (MWCNTs or MWNTs), between open or closed carbon nanotubes (i.e., with a "cap", which for example is a section of a fullerene structure), and also between empty and filled (with, for example, silver, liquid lead, noble gases, etc.) carbon nanotubes.

The diameter of the carbon nanotubes (CNTs) is in the region of a few nanometers (e.g., 1 to 50 nm), although carbon nanotubes (CNTs) with tube diameters of only 0.4 nm have already been prepared. Lengths ranging from several micrometers up to millimeters for individual tubes and up to a few centimeters for tube bundles have already been attained.

Depending on the detail of the structure, the electrical conductivity within the carbon nanotubes is metallic or semiconducting. There are also carbon nanotubes known which at low temperatures are superconducting.

Transistors and simple circuits with semiconducting carbon nanotubes have already been produced. Additionally, attempts have already been made to carry out specific production of complex circuits from different carbon nanotubes.

The mechanical properties of carbon nanotubes are outstanding: CNTs have—for a density of, for example, 1.3 to 1.4 $g/cm^3$—an enormous tensile strength of several megapascals; in comparison to this, steel, for a density of at least 7.8 $g/cm^3$, has a maximum tensile strength of only about 2 MPa, thus giving a ratio of tensile strength to density, arithmetically, which for some CNTs is at least 135 times better than for steel.

Of particular interest for the field of electronics are the current rating and the electrical and thermal conductivities: The current rating is by estimation 1000 times higher than in the case of copper wires, whereas the thermal conductivity at room temperature is almost twice as high as that of diamond. Since CNTs may also be semiconductors, they can be used to manufacture outstanding transistors which withstand higher voltages and temperatures—and hence higher clock frequencies—than silicon transistors; functioning transistors have already been produced from CNTs. Furthermore, CNTs can be used to realize nonvolatile memories. CNTs can also be used in the field of metrology (e.g., scanning tunneling microscopes).

On the basis of their mechanical and electrical properties, carbon nanotubes can also find application in plastics: As a result, for example, the mechanical properties of the plastics are greatly improved. Furthermore, it is possible in this way to produce electrically conducting plastics.

Carbon nanotubes (CNTs) are commercially available and are supplied by numerous manufacturers (e.g., by Bayer MaterialScience AG, Germany; CNT Co. Ltd., China; Cheap Tubes Inc., USA; and Nanocyl S. A., Belgium). Corresponding manufacturing processes are familiar to the skilled worker. Thus, for example, carbon nanotubes (CNTs) can be prepared by arc discharge between carbon electrodes, for example; by means of laser ablation ("vaporization") starting from graphite; or by catalytic decomposition of hydrocarbons (chemical vapor deposition, CVD for short).

The properties described above for the carbon nanotubes (CNTs) and the possible applications which arise from these properties have awoken great interest. In particular, for a range of applications, there is a need for the carbon nanotubes (CNTs) to be provided in a readily manageable form, preferably in the form of dispersions.

The dispersing of carbon nanotubes (CNTs) poses a great challenge, since the carbon nanotubes (CNTs) are very difficult to convert into stable dispersions, especially because the carbon nanotubes (CNTs) possess a very high aspect ratio and are present in highly agglomerated and/or coiled forms.

In the prior art, therefore, there has been no lack of attempts to stably disperse carbon nanotubes (CNTs). The methods known from the prior art, however, are not very suitable for generating stable, concentrated dispersions of carbon nanotubes (CNTs): in the majority of cases the methods of the prior art do not lead to storage-stable dispersions, and, moreover, the concentration of carbon nanotubes (CNTs) in the prior-art dispersions is usually extremely small.

Thus, certain prior-art methods are aimed first at modifying the surface of the carbon nanotubes (CNTs) to be dispersed, by means of a costly and inconvenient prior pretreatment, particularly for the purpose of making the surface polar in order to facilitate subsequent dispersing. Methods suitable for modifying the carbon nanotubes (CNTs) are, for example, oxidative processes, especially chemical pretreatment, halogenation, or other polarization processes for modifying the surfaces of the carbon nanotubes (CNTs). One method of this kind, which provides, for example, for prior fluorination of the surfaces of the carbon nanotubes (CNTs) prior to their dispersing, is described for example in U.S. Pat. No. 6,827,918 B2.

A disadvantage of these methods is the costly and inconvenient pretreatment, which particularly when implemented on an industrial scale results in more difficult implementation of the method, with significantly higher costs.

Also described in the prior art have been methods which convert the carbon nanotubes into aqueous dispersions in the presence of a water-soluble polymer material (cf., e.g., US 2004/0131859 A1 and WO 02/076888 A1). These methods, however, have the disadvantage that, on the one hand, they are not universally employable, but instead are restricted to aqueous dispersion media, and, on the other hand, that they lead only to dispersions having relatively low carbon nanotube (CNT) contents. The prevailing object of the two aforementioned publications, instead, is the conversion of the dispersions described therein into a redispersible powder of carbon nanotubes (CNTs).

The above-described methods of the prior art usually result in inhomogeneous dispersions, often lacking long-term stability, of carbon nanotubes (CNTs), with low concentrations or contents of CNTs. Furthermore, the prior-art dispersions—in comparison to the pure dispersion medium—exhibit a high to extreme increase in viscosity, coupled with low particle contents of carbon nanotubes (CNTs), of only up to about 1% by weight.

In relation to industrial implementation, these prior-art dispersions are associated with a great disadvantage, and consequently there is an increased demand for improved dispersions of carbon nanotubes (CNTs) in various media.

BRIEF SUMMARY

A method of dispersing carbon nanotubes (CNTs) in a continuous phase, especially in at least one dispersion medium, the carbon nanotubes, especially without prior pretreatment, being dispersed in a continuous phase, especially in at least one dispersion medium, in the presence of at least one dispersant (dispersing agent), with introduction of an energy input sufficient for dispersing, and also to the dispersions that are obtainable in this way, and to their use. With the method of the invention it is possible for the carbon nanotubes (CNTs) to be dispersed in high concentrations and with high storage stability.

It is an object of the present invention, therefore, to provide a method of preparing dispersions of carbon nanotubes (CNTs), the intention being that the disadvantages outlined above and associated with the prior art should be at least substantially avoided or else at least attenuated.

A further object of the present invention is to provide dispersions of carbon nanotubes (CNTs) having properties which are improved in comparison to the corresponding prior-art dispersions, more particularly having increased storage stabilities and/or having higher carbon nanotube (CNT) contents, preferably in tandem with good manageability, such as effective fluidity, etc.

DETAILED DESCRIPTION

Figure 1:
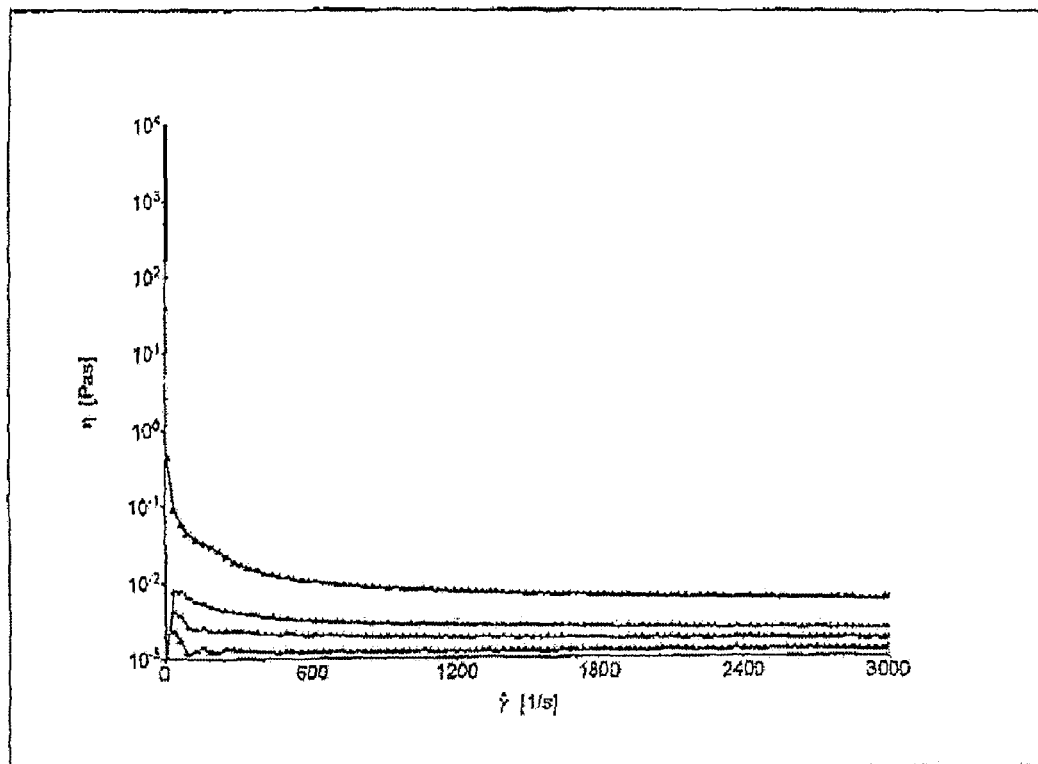
FIG. 1 shows the viscosities of PMA dispersions with different CNT contents (0.1%, 0.5%, 1.0%, 2.0%, 3.0%, and 5.0%; curves considered from bottom to top), with a constant quantity of dispersant, of 200% by weight in relation to CNTs.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

The applicant has now surprisingly found that the problem outlined above can be efficiently solved if the carbon nanotubes (CNTs) are dispersed in a continuous phase, especially in at least one dispersion medium, in the presence of at least one dispersant (dispersing agent), with introduction of an energy input which is sufficient for dispersing.

In an entirely surprising way it has now in fact been found that, through the combination of a suitable dispersant (dispersing agent) in interaction with high energy inputs, especially high shear forces, it is possible to provide a gentle and inexpensive method of stably dispersing carbon nanotubes (CNTs) in significantly higher concentrations and in a multiplicity of dispersion media.

To solve the problem outlined above, therefore, the present invention proposes a dispersion method as described herein. Further, advantageous properties of the method of the invention are subject matter of the relevant dependent method claims.

Further subject matter of the present invention are the dispersions of carbon nanotubes (CNTs) that are obtainable by the method of the invention, and as are defined or described in the corresponding claims directed to the dispersions themselves.

Finally, a further subject of the present invention is the use of the dispersions of carbon nanotubes (CNTs) which are obtainable by the method of the invention, such use being as defined or described in the corresponding use claims.

The present invention—according to a first aspect of the present invention—accordingly provides a method of dispersing carbon nanotubes (CNTs) in a continuous phase, especially in at least one dispersion medium, i.e., therefore, a method of preparing dispersions of carbon nanotubes (CNTs) in a continuous phase, especially in at least one dispersion medium, the carbon nanotubes (CNTs) being dispersed, especially without prior pretreatment of the carbon nanotubes (CNTs), in a continuous phase, especially in at least one dispersion medium, in the presence of at least one dispersant (dispersing agent), with introduction of an energy input sufficient for dispersing.

With regard to the concept of the dispersion, as it is used in the context of the present invention, reference may be made in particular to DIN 53900 of July 1972, according to which the concept of the dispersion is a designation for a system (i.e., disperse system) of two or more phases, of which one phase is continuous (namely the dispersion medium) and at least one further phase is finely divided (namely the dispersed phase or the dispersoid; in this case the carbon nanotubes). In the context of the present invention the concept of the dispersion is designated exclusively in relation to the designation of suspensions, i.e., dispersions of insoluble particulate solids in liquids.

The concept of the dispersant—also designated, synonymously, as dispersing agent, dispersing additive, wetting agent, etc—as used in the context of the present invention designates, generally, substances which facilitate the dispersing of particles in a dispersion medium, especially by lowering the interfacial tension between the two components—particles to be dispersed, on the one hand, and dispersant, on the other hand—and so by inducing wetting. Consequently there are a multiplicity of synonymous designations for dispersants (dispersing agents) in use, examples being dispersing additive, antisettling agent, wetting agent, detergent, suspending or dispersing assistant, emulsifier, etc. The concept of the dispersant should not be confused with the concept of the dispersion medium, the latter designating the continuous phase of the dispersion (i.e., the liquid, continuous dispersion medium). In the context of the present invention the dispersant, additionally, serves the purpose of stabilizing the dispersed particles as well (i.e., the carbon nanotubes), i.e., of holding them stably in dispersion, and of avoiding or at least minimizing their reagglomeration in an efficient way; this in turn leads to the desired viscosities of the resulting dispersions, since, in this way, readily manageable, fluid systems result in practice—even in the case of high concentrations of the dispersed carbon nanotubes. Without the use of the dispersant, in contrast, there would be such an increase in the viscosity of the resulting dispersions, as a result of unwanted reagglomeration of the dispersed CNTs, that—at least at relatively high CNT concentrations—there would in practice no longer be manageable systems resulting, since those systems would have too high a viscosity or too low a fluidity.

For further details relating to the terms "dispersoid", "dispersing", "dispersant", "disperse systems", and "dispersion", reference may be made, for example, to Römpp Chemielexikon, 10th edition, Georg Thieme Verlag, Stuttgart/New York, Volume 2, 1997, pages 1014/1015, and also to the literature referred to therein, the entire disclosure content of which is hereby incorporated by reference.

A particular feature of the method of the invention is to be seen in the fact that, in accordance with the invention, the dispersing operation takes place with sufficient input of energy (e.g., input of shearing energy); on the one hand the energy introduced must be sufficient to provide the energy needed for dispersing, especially to disrupt the agglomerates, conglomerates, coils, etc formed by the carbon nanotubes (CNTs), but on the other hand it must not exceed a certain level above which destruction of the carbon nanotubes (CNTs) begins—and this must be the case in the presence of a suitable dispersant (dispersing agent) which is capable of stabilizing the individual carbon nanotubes (CNTs) and of preventing reagglomeration occurring again, and also of facilitating the subsequent dispersing and in that way stabilizing the resultant dispersions.

With the method of the invention it is possible in a surprising way to obtain relatively high concentrations of carbon nanotubes (CNTs) in the resultant dispersions. In particular the method of the invention can be used to prepare dispersions having solids contents, in terms of carbon nanotubes (CNTs), of 5% by weight or more, based on the resultant dispersions. In general the carbon nanotubes (CNTs) are dispersed in amounts of $1 \times 10^{-5}\%$ to 30%, in particular $1 \times 10^{-4}\%$ to 20%, preferably $1 \times 10^{-3}$ to 10%, more preferably $1 \times 10^{-2}\%$ to 7.5%, very preferably $1 \times 10^{-1}\%$ to 5%, by weight, based on the resultant dispersions, in the continuous phase.

In order to allow economically rational application, the method of the invention ought to be implemented or concluded within a certain, or relatively short, period of time, which in turn requires a particular energy input per unit time. Generally speaking, the method of the invention, or the dispersing operation, is carried out within a period of 0.01 to 30 minutes, especially 0.1 to 20 minutes, preferably 0.2 to 15 minutes, more preferably 0.5 to 10 minutes, very preferably 0.5 to 5 minutes. Nevertheless, owing to a particular case, or relative to the application, it may be necessary to deviate from the times specified above, without departing from the scope of the present invention.

As outlined above, it is necessary, in order to carry out the dispersing operation, for there to be a sufficient input of energy into the dispersion medium, which on the one hand must be sufficient to ensure reliable dispersing of a carbon nanotubes (CNTs), and on the other hand must not be so high that there is destruction of the carbon nanotubes (CNTs) or of their structures.

The provision of the required energy input is accomplished preferably by means of ultrasound treatment. Nevertheless, other possibilities can also be realized in the context of the present invention, an example being the application of high-pressure nozzles, although the treatment by means of ultrasound is preferred in accordance with the invention.

In general, the amount of energy introduced can vary within wide ranges. In particular the amount of energy introduced, calculated as energy introduced per unit quantity of carbon nanotubes (CNTs) to be dispersed, is 5000 to 500 000 kJ/kg, especially 10 000 to 250 000 kJ/kg, preferably 15 000 to 100 000 kJ/kg, more preferably 25 000 to 50 000 kJ/kg. Nevertheless, relative to the application or as a result of a specific case, it may be necessary to deviate from the aforementioned figures, without departing the scope of the present invention.

Typically the dispersing operation proper is preceded by a method step in which the carbon nanotubes (CNTs) for subsequent dispersion are contacted with the continuous phase, especially with the dispersion medium, and with the dispersant (dispersing agent), and also, where appropriate, with further constituents or ingredients of the dispersion, and these components are homogenized with one another, especially with corresponding input of energy, preferably with stirring. The energy input required for this purpose, however, is smaller than for the dispersing operation as such, and so a customary stirring or mixing operation is sufficient for this purpose.

In general, the method of the invention is carried out at temperatures below the boiling temperature of the continuous phase, especially of the dispersion medium. Preferably the method of the invention is carried out at temperatures in the range from 10 to 100° C., preferably 15 to 70° C. In this case it may where appropriate be necessary to carry out the dispersing operation with cooling, since the energy input results in an increase in the temperature of the resultant dispersion.

As outlined above, an advantage of the present invention is to be seen in the fact that the dispersing operation is carried out without prior pretreatment of the carbon nanotubes (CNTs) to be dispersed, especially without prior oxidation, chemical treatment (e.g., with oxidizing agents, such as nitric acid, ozone, etc), thermal treatment, polarization, halogenation or the like.

In the context of the method of the invention it is possible to use virtually any desired carbon nanotubes (CNTs), of the kind preparable by processes known from the prior art or else available as commercial products (e.g., from Bayer MaterialScience AG, Leverkusen).

The carbon nanotubes (CNTs) used in accordance with the invention may be, for example, single-wall carbon nanotubes (SWCNTs or SWNTs) or multiwall carbon nanotubes (MWCNTs or MWNTs), especially 2- to 30-wall, preferably 3- to 15-wall, carbon nanotubes.

The carbon nanotubes (CNTs) used in accordance with the invention may have average internal diameters of 0.4 to 50 nm, especially 1 to 10 nm, preferably 2 to 6 nm, and/or average external diameters of 1 to 60 nm, especially 5 to 30 nm, preferably 10 to 20 nm. The carbon nanotubes (CNTs) used in accordance with the invention may have average lengths of 0.01 to 1000 μm, especially 0.1 to 500 μm, preferably 0.5 to 200 μm, more preferably 1 to 100 μm.

Furthermore, the carbon nanotubes (CNTs) used in accordance with the invention may have a tensile strength per carbon nanotube of at least 1 GPa, especially at least 5 GPa, preferably at least 10 GPa, and/or an elasticity modulus per carbon nanotube of at least 0.1 TPa, especially at least 0.5 TPa, preferably at least 1 TPa, and/or a thermal conductivity of at least 500 W/mK, especially at least 1000 W/mK, preferably at least 2000 W/mK, and/or an electrical conductivity of at least $10^3$ S/cm, especially at least $0.5 \times 10^4$ S/cm, preferably at least $10^4$ S/cm.

Typically employed carbon nanotubes (CNTs) have a bulk density in the range from 0.01 to 0.3 g/cm$^3$, especially 0.02 to 0.2 g/cm$^3$, preferably 0.1 to 0.2 g/cm$^3$, and are present in the form of agglomerates or conglomerates of a multiplicity of carbon nanotubes (CNTs), especially in highly coiled form.

Inventively suitable carbon nanotubes (CNTs) are available commercially, as for example from Bayer MaterialScience AG, Leverkusen, an example being the product series Baytubes® (e.g., Baytubes® C 150 P).

As far as the continuous phase or dispersion medium is concerned, it is possible in the context of the present invention, in principle, to employ aqueous-based, organic-based or aqueous-organic-based dispersion media, preference being given to using organic dispersion media. Typically the continuous phase used is a dispersion medium which is present in the liquid aggregate state under dispersing conditions, especially under atmospheric pressure (101.325 kPa) and in a temperature range from 10 to 100° C., preferably 15 to 70° C.

In an inventively preferred way the dispersion medium used as the continuous phase is a dispersion medium which is selected from the group of (i) alcohols, especially straight-chain, branched or cyclic, monohydric or polyhydric alcohols, such as methanol, ethanol, butanol, ethylhexanol, decanol, isotridecyl alcohol, benzyl alcohol, propargyl alcohol, oleyl alcohol, linoleyl alcohol, oxo-process alcohols, neopentyl alcohol, cyclohexanol, fatty alcohols, and diols and polyols, such as glycols; (ii) ether alcohols, such as 2-methoxyethanol, monophenyl diglycol, phenylethanol, ethylene glycol, and propylene glycol; (iii) hydrocarbons, such as toluene, xylene, and aliphatic and/or cycloaliphatic benzine fractions, chlorinated hydrocarbons, such as chloroform and trichloroethane; (iv) ethers, especially cyclic and acyclic ethers, such as dioxane, tetrahydrofuran, and polyalkylene glycol dialkyl ethers; (v) carboxylic esters, especially monocarboxylic esters, such as ethyl acetate and butyl acetate; and dicarboxylic or polycarboxylic esters, such as dialkyl esters of $C_2$ to $C_4$ dicarboxylic acids ("Dibasic Esters"); (vi) ether esters, especially alkylglycol esters, such as ethylglycol acetate and methoxypropyl acetate; (vii) lactones, such as butyrolactone; (viii) plasticizers, especially phthalates; (ix) aldehydes and ketones, such as methyl isobutyl ketone, cyclohexanone, and acetone; (x) acid amides, such as dimethylformamide; (xi) N-methylpyrrolidone; and also mixtures of the aforementioned dispersion media.

Furthermore, it is also possible in principle to employ ionic liquids or what are known as supercritical fluids as a dispersion medium. Water as well is a suitable dispersion medium in the context of the present invention.

As far as the inventively used dispersant is concerned, it is more particularly a polymeric dispersant, especially a polymeric dispersant based on a functional polymer, preferably having a number-average molecular mass of at least 500 g/mol, preferably at least 1000 g/mol, more preferably at least 2000 g/mol. In particular the inventively used dispersant may be selected from the group of polymers and copolymers having functional groups and/or groups with pigment affinity, alkylammonium salts of polymers and copolymers, polymers and copolymers having acidic groups, comb copolymers and block copolymers, such as block copolymers having groups with pigment affinity, especially basic groups with pigment affinity, optionally modified acrylate block copolymers, optionally modified polyurethanes, optionally modified and/or salified polyamines, phosphoric esters, ethoxylates, polymers and copolymers having fatty acid radicals, optionally modified polyacrylates, such as transesterified polyacrylates, optionally modified polyesters, such as acid-functional polyesters, polyphosphates, and mixtures thereof.

Furthermore it is possible in principle, as dispersants suitable in accordance with the invention, to use all of the dispersants, surfactants, wetting agents, etc, that are known for that purpose.

In an inventively preferred way the compounds selected as dispersants are especially those compounds of the kind described in publications EP 1 593 700 B1, EP 0 154 678 B1, EP 0 318 999 B1, EP 0 270 126 B1, EP 0 893 155 B1, EP 0 417 490 B1, EP 1 081 169 B1, EP 1 650 246 A1, EP 1 486 524 A1, EP 1 640 389 A1, EP 0 879 860 B1, WO 2005/097872 A1, and EP 1 416 019 A1, the respective disclosure content of which is hereby incorporated in full by reference. These compounds are described or defined more closely in claims 13 to 17 (=EP 1 593 700 B1), claim 18 (=EP 0 154 678 B1), claim 19 (=EP 0 318 999 B1), claim (=EP 0 270 126 B1), claim 21 (=EP 0 893 155 B1), claim 22 (=EP 0 417 490 B1), claim 23 (=EP 1 081 169 B1), claim 24 (=EP 1 650 246 A1), claim 25 (=EP 1 486 524 A1), claim 26 (=EP 1 640 389 A1), claim (=EP 0 879 860 B1), claim 28 (=WO 2005/097872 A1), and claim 29 (=EP 1 416 019 A1).

As far as the method of the invention is concerned, it can in principle be carried out in continuous operation or in discontinuous operation, and this can be done in a relatively small amount of time. On account of its low level of complexity, the method of the invention can be readily employed industrially, can be carried out flexibly and economically, and can be configured adaptably up to production on the tonne scale.

In principle the method of the invention can be employed for any of a very wide variety of dispersion media, of dispersants or dispersing agents, and of carbon nanotubes (CNTs), and can be readily combined with further processes or process steps.

As outlined at the outset, the dispersing of CNTs poses a great challenge, because the CNTs possess a very large aspect ratio and are present in a highly coiled form: for instance, the diameters range, for example, from 3 to 25 nm, but the lengths range, for example, up to about 10 mm. On account of the high degree of coiling, very high energy inputs or shearing forces are necessary in order to separate the CNTs. Where uncoiling is accomplished only by means of high energy input, without simultaneous use of suitable dispersants, the CNTs are only size-reduced, and not sufficiently stabilized, and so the resulting dispersions are inhomogeneous and lack long-term stability. The use of dispersants is aimed on the one hand at wetting the CNTs, in order to ensure easier and more gentle uncoiling, and on the other hand at stabilizing the resulting separated CNTs by coating with the dispersant, with the consequence that, with the method of the invention, stable homogeneous dispersions are obtained. Ideally the dispersions exhibit only a slight increase in viscosity, and high activity of the CNTs.

In contrast, the methods described in the prior art usually result in inhomogeneous dispersions which lack long-term stability. Furthermore, the prior-art dispersions exhibit a high increase in viscosity in tandem with low particle contents of only about 1% at most.

Surprisingly it has now been found that, in the context of the method of the invention, by combining suitable dispersants with high energy inputs or shearing forces, a gentle and cost-effective method is provided for stably dispersing CNTs in any of a very wide variety of media and at significantly higher concentrations.

The method of the invention leads to dispersions having high carbon nanotube (CNT) contents or with high degrees of filling (above 5% by weight, for example, based on the resultant dispersions), and it accomplishes this at the same time as low viscosities and hence ready manageability.

Furthermore, the dispersions obtainable by the method of the invention exhibit high storage stabilities.

Accordingly the present invention—according to a second aspect of the present invention—provides dispersions of carbon nanotubes (CNTs) in a continuous phase, especially in at least one dispersion medium, which are obtainable by the method of the invention as outlined above.

For further relevant details concerning the dispersions of the invention, reference may be made to the corresponding claims directed to the dispersions themselves.

The dispersions according to the present invention that are obtainable by the method of the invention have an extraordinary stability, especially storage stability; in particular the dispersions of the invention are storage-stable over at least a week, preferably at least a month, more preferably at least three months, very preferably at least six months. As outlined above, the dispersions of the invention are, furthermore, fluid at room temperature and in this way are readily manageable. The dispersions prepared in accordance with the invention exhibit a newtonian or at most thixotropic and/or structurally viscous behavior, preferably a newtonian behavior.

The dispersions obtainable in accordance with the invention are suitable for a multiplicity of applications. Further provided by the present invention—in accordance with a third aspect of the present invention—is, accordingly, the inventive use of the dispersions obtainable by the method of the invention, as is defined in the corresponding use claims.

Thus, for example, the dispersions of the invention are suitable for application in the field of electronics, as for example in the field of computer engineering and the computer industry, semiconductor engineering and the semiconductor industry, and metrology and the metrological industry, for the purpose, for example, of producing conducting or semiconducting structures, nanoelectric structures and devices, transistors, nonvolatile memories, displays and screens and their components, and also metrological and computer parts and components, such as circuits, diodes, and the like, etc.

Additionally the dispersions of the invention are suitable for application or incorporation in plastics and polymeric compositions, coatings, paints, inks, composite materials, and the like.

By way of example the dispersions of the invention can be used in order to increase the electrical conductivity and/or to improve the mechanical properties, especially the strength, preferably in relation to the aforementioned materials (i.e., plastics and polymeric compositions, coatings, paints, inks, composite materials, etc). Thus, for example, the dispersions of the invention are suitable as reinforcing materials in the aforementioned materials.

Furthermore, the dispersions prepared in accordance with the invention are suitable for producing bundles, fibers, mats, and other coherent structures of carbon nanotubes (CNTs) (e.g., after removal of the dispersion medium).

Moreover, the dispersions of the invention are suitable for application in the field of aerospace technology.

A further field for application of the dispersions of the invention is the field of cooling technology, especially in relation to the production of heat sinks for any of a very wide variety of applications (e.g., for GSM base stations, as CPU coolers, etc).

Finally the dispersions of the invention can also be used for shielding from electrical and/or electromagnetic radiation, especially in the aforementioned materials (i.e., plastics and polymeric compositions, coatings, paints, inks, composite materials, etc).

Further embodiments, modifications, and variations of the present invention are readily evident and realizable for the skilled worker on reading the description, without departing the scope of the present invention.

The present invention is illustrated by reference to the examples which follow, but which are not intended to restrict the present invention.

EXAMPLES

Examples A

The particular advantages of the invention are described below, using as an example the dispersing of CNTs in PMA (propylene glycol monomethyl ether or methoxypropyl acetate) as dispersion medium, using different dispersants and an ultrasound dispersing unit.

First of all various comparative experiments with and without dispersants, with only a Dispermat, were carried out, but in all cases the result was disappointing: The dispersions were very inhomogeneous and underwent complete sedimentation after a time of just a few hours to a day.

Similar comparative experiments with the ultrasonic transducer, in contrast, showed better outcomes: Thus a 0.1% dispersion of CNTs without dispersant undergoes only slight sedimentation, but is still very inhomogeneous. In this case the agglomerates are in fact disrupted, but the CNTs are damaged to a high degree and are not sufficiently stabilized. A dispersion prepared in this way is not suitable for industrial use. The addition of a dispersant, though, increases the result considerably.

Thus, if only ultrasound or only dispersant is used, the experiments result in unstable and inhomogeneous dispersions or suspensions with significant sedimentation behavior.

In inventive experiments, different dispersants were employed in different quantities, in combination with the input of ultrasound, leading to the desired outcomes.

TABLE 1

Wetting agents and dispersants used

| Dispersant | Structure | Solids |
| --- | --- | --- |
| DISP-I | High molecular mass copolymer having groups with affinity for pigment (example 23 of EP 1 593 700 B1) | 98% |
| DISP-II | Alkylammonium salt of a high molecular mass copolymer (example 28 of EP 0 893 155 B1) | 96% |

As a first experimental series, 1% dispersions of MWCNTs in methoxypropyl acetate (PMA) were prepared with use of ultrasound (table 2). The results were evaluated on the basis of the visual impression directly after the dispersing operation; the sedimentation behavior; and the viscosity. The dispersions are prepared in the same way as described in example B below.

TABLE 2

Experimental overview of the 1% dispersions of MWCNTs in PMA

| Dispersant | Dispersant concentration (based on CNTs) | Dispersing | Viscosity | Flocculates | Stability |
| --- | --- | --- | --- | --- | --- |
| DISP-II | 20.0% | ultrasound | high | large particles on the glass wall | not determinable |
| DISP-I | 20.0% | ultrasound | high | large particles on the glass wall | not determinable |
| none | 0% | ultrasound | high | large particles on the glass wall | not determinable |
| none | 0% | Dispermat | low | complete phase separation | completely sedimented |

In order to allow better assessment of the sedimentation behavior in particular, a second step saw more highly dilute dispersions being prepared with these dispersants (table 3). At a concentration of 0.1%, the dispersion stabilized with DISP-I showed the best result.

TABLE 3

Experimental overview of the 0.1% dispersions of MWCNTs in PMA

| Dispersant | Dispersant concentration (based on CNTs) | Dispersing | Viscosity | Flocculates | Stability |
| --- | --- | --- | --- | --- | --- |
| DISP-II | 100.0% | ultrasound | low | few | only slight phase separation |
| DISP-I | 50.0% | ultrasound | low | none | no sedimentation |
| DISP-I | 100.0% | ultrasound | low | few to none | no sedimentation |
| DISP-I | 100.0% | Dispermat | low | complete phase separation | completely sedimented |
| DISP-I | 150.0% | ultrasound | low | none | no sedimentation |
| none | 0% | Dispermat | low | complete phase separation | completely sedimented |
| none | 0% | ultrasound | low | numerous | slight sedimentation |

In the course of the experiments it became apparent, surprisingly, that the combination of DISP-I and ultrasound produced very good results. The results were so good that the system could also be increased to a 5% CNT content, and the dispersions exhibited outstanding properties and excellent storage stabilities. A further increase to 10% or more CNT content was realized as well.

Additionally it was observed that the method of the invention—irrespective of the mode of preparation of the CNTs—can be realized successfully, in other words that the method of the invention is suitable for use universally for CNTs and does not require prior surface modification of the CNTs (in situ or post-synthesis), thereby allowing massive cost savings.

This results in immense opportunities for the industrial use of CNTs in numerous applications, since the dispersions have the following advantages:

high degrees of filling, or more than 5% by weight CNTs
homogeneous dispersions with long-term stability
gentle dispersion method (gentle uncoiling of the CNTs)
can be used universally for all commercially available CNTs
cost-effective dispersing method, equally upscalable and suitable for both batch and continuous operation
can be combined with further process steps
low viscosities realizable if needed
addition of further functionalized additives possible
functionalization of the dispersant possible.

In further experiments it was shown that the method of the invention can also be transposed to other solvents. When water or extremely nonpolar media are employed, of course, the requirements concerning the functional groups of the dispersant are different.

Furthermore, the dispersions prepared in accordance with the invention can be processed further, for orientation of the CNTs in the dispersion medium matrix, for example. Hence it is possible to carry out parallel alignment of CNTs in an electrical field. For this purpose, however, the CNTs must be present in individualized and homogenously dispersed form, ideally at a high concentration. This is now ensured for the first time through the method of the invention. A subsequent parallel orientation is therefore possible, and for many applications is essential.

A corresponding experimental system is designed as follows: In a tank, a suspension of the agglomerated CNTs in the desired dispersion medium is introduced, together with the dispersant, and is then pumped in a circuit through a flow cell, in which the dispersing operation takes place by means of ultrasound. The resulting dispersion can then either be recycled to the tank and dispersed in the circuit until the desired degree of dispersion has been achieved (batch operation), or can be pumped into a further flow cell with ultrasound dispersing unit (continuous operation). This may then be followed by mixing, as for example with a resin (or a paint, a coating liquid, etc), and subsequent passage through an electrical field provides for parallel alignment of the CNTs. The parallel alignment may alternatively take place at a later point in time. The prerequisite is merely a stable dispersion of individualized CNTs, something which is ensured by the method of the invention.

Examples B

Preparation of a 1.0% Dispersion of CNTs (Baytubes®, e.g., Baytubes® C 150 P) in Methoxypropyl Acetate (PMA) with 100% of DISP-I A 350 ml PE beaker is charged with 196 g of PMA and 2 g of DISP-I, and this initial charge is homogenized using a Dispermat at 1000 rpm with a toothed disc (d=40 mm). 2 g of CNTs are added to the mixture, and the PE vessel is placed into a stainless steel double-wall vessel, cooled to 5° C., with water as the cooling medium. Dispersing takes place using an ultrasonotrode (d=38 mm), which is immersed to about 2 to 3 cm in the medium. With a power of approximately (500±20) W, the suspension is dispersed for 1.5 to 2 min, in such a way that the temperature remains below 70° C. The result is a homogeneous, storage-stable, black dispersion of low viscosity.

Viscosities
Viscosity as a Function of the Degree of CNT Filling

Figure 2:
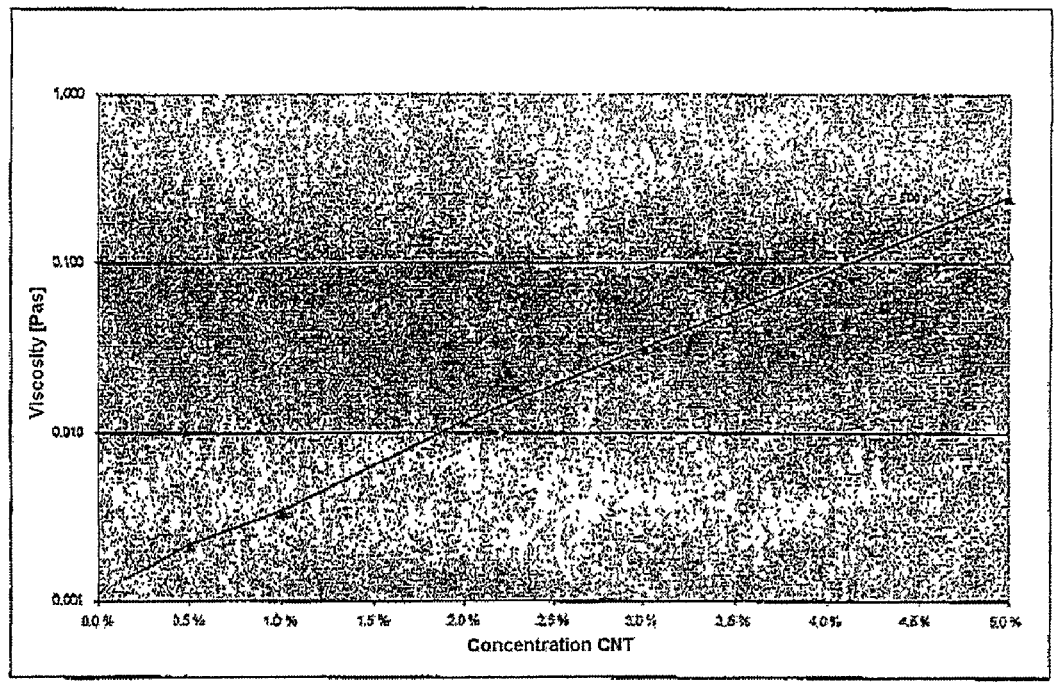
FIG. 2 is a corresponding logarithmic plot of the viscosities of PMA dispersions having different CNT contents against the concentration of the CNTs.

To illustrate the increase in viscosity with increasing degree of CNT filling, the viscosities of different dispersions in PMA, with CNT contents in the range from 0.1% to 5%, were measured (FIG. 1 and FIG. 2). As can be seen, the viscosity rises exponentially with the concentration, but even at concentrations above 3% is still within a manageable range. FIG. 1 shows the viscosities of PMA dispersions with different CNT contents (0.1%, 0.5%, 1.0%, 2.0%, 3.0%, and 5.0%; curves considered from bottom to top), with a constant quantity of dispersant, of 200% by weight in relation to CNTs, and FIG. 2 is a corresponding logarithmic plot of the viscosities of PMA dispersions having different CNT contents against the concentration of the CNTs.

Viscosity as a Function of the Fraction of Dispersant

Figure 3:
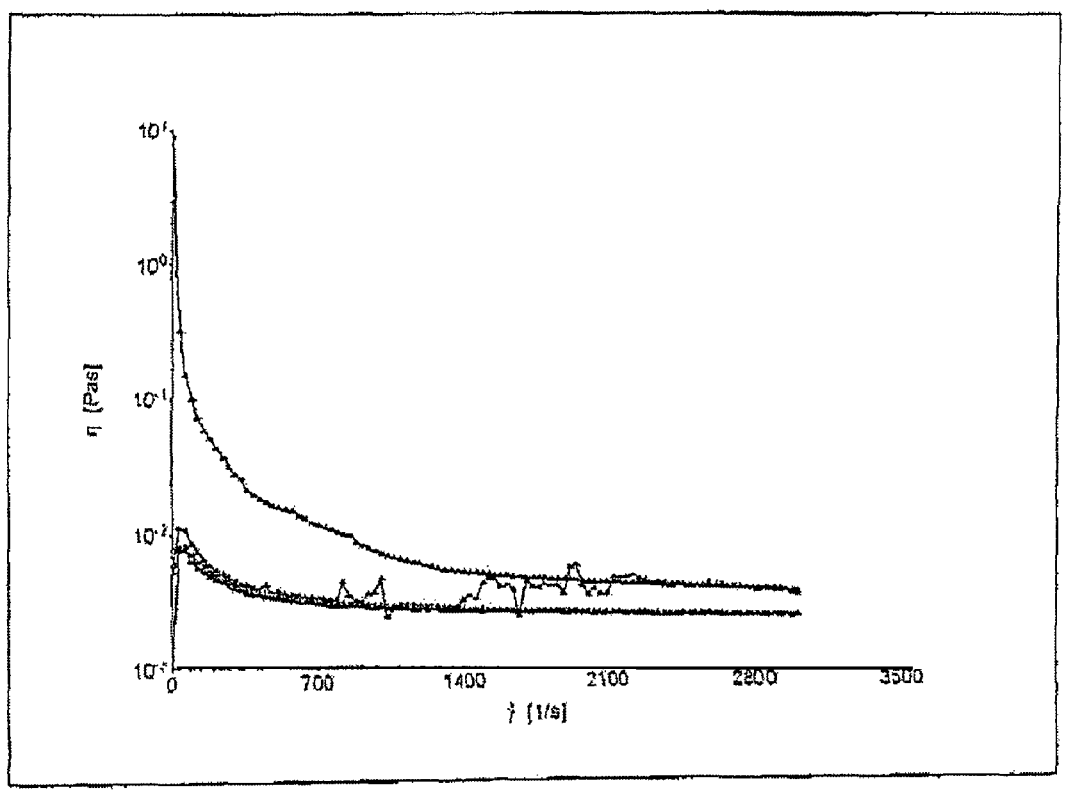
FIG. 3 shows a comparison of the viscosities of 1% dispersions of CNTs in PMA with different amounts of DISP-I (50%, 100%, 150%, and 200%, by weight, based on CNTs; curves considered from top to bottom).

In view of the large surface area of the CNTs and their urge to form coils, a high dispersant fraction must be used. Consequently dispersant concentrations of 50% to 200% by weight (based on CNTs) were used. The measure used for the dispersing is again the viscosity. From FIG. 3 it is evident that, from a dispersant concentration of 150%, the viscosity remains still at a low level. Significantly lower concentrations lead to higher viscosities. FIG. 3 shows a comparison of the viscosities of 1% dispersions of CNTs in PMA with different amounts of DISP-I (50%, 100%, 150%, and 200%, by weight, based on CNTs; curves considered from top to bottom).

Comparison of Different CNTs

Figure 4:
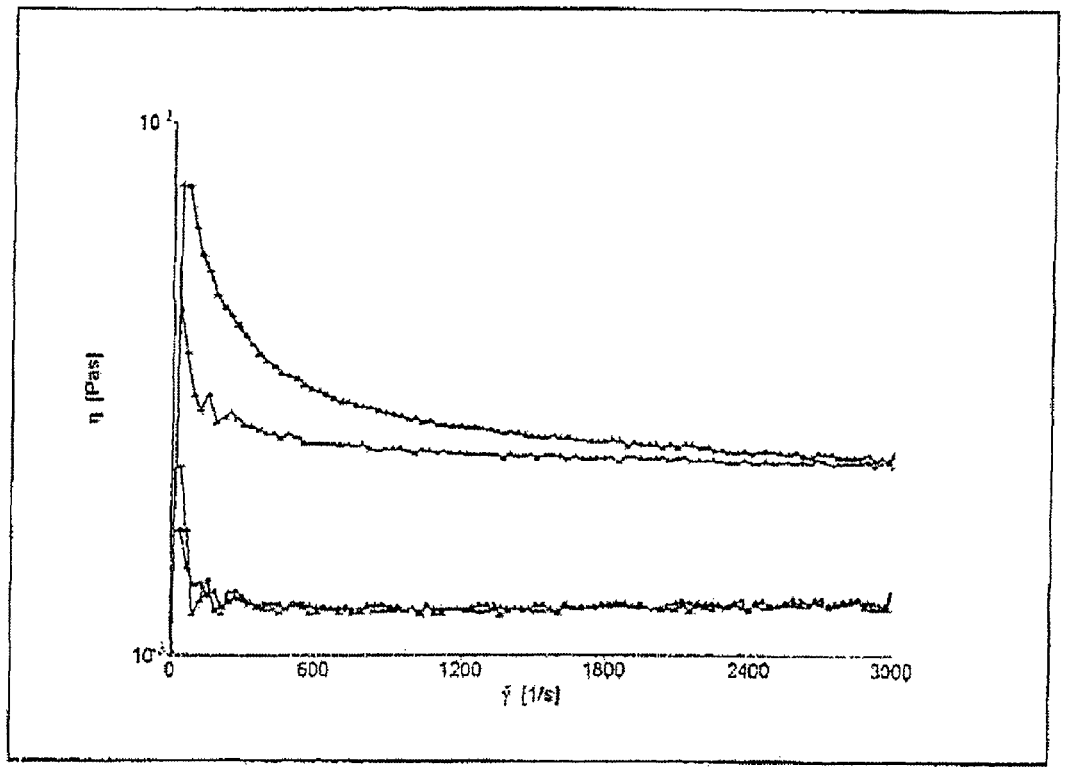
FIG. 4 shows by way of example the viscosities of 0.1% (bottom curves) and 1% (top curves) dispersions of CNTs in PMA, on the one hand for Baytubes® C 150 P from Bayer MaterialScience AG and on the other hand for CNTs from CNT Co., Ltd.).

As is evident from FIG. 4, the method of the invention for dispersing CNTs can be applied almost universally to a very wide variety of different kinds of CNTs. FIG. 4 shows by way of example the viscosities of 0.1% (bottom curves) and 1% (top curves) dispersions of CNTs in PMA, on the one hand for Baytubes® C 150 P from Bayer MaterialScience AG and on the other hand for CNTs from CNT Co., Ltd.). It is clearly apparent that the viscosities are virtually identical, irrespective of the manufacturer from which the CNTs originate.

Summary of the Results

The present results were determined under measuring conditions which "circumvent" the "wall gliding" of the samples and allow a comparison of the low-concentration and high-concentration CNT suspensions. The resulting measurements can admittedly not be considered to be absolute values, but do serve as a basis for an empirical comparison of the samples.

The 0.1% and 1.0% unstabilized suspensions, without dispersant, of Baytubes® in PMA cannot be measured, owing to the sedimentation behavior.

Through the method of the invention it is possible to prepare fluid pastes having a CNT content of more than 5% by weight.

Of the wetting agents tested, DISP-I showed itself to be the most effective in terms of the viscosity level.

The viscosity rises exponentially with the increase in the solids content of the CNTs and with the same application of dispersant (200% by weight of DISP-I).

Measuring Conditions
ThermoHaake RS300 with UTCE/C electrical thermal conditioning unit
Measurement system: 35 mm 1° cone/plate system
Experimental mode: rotation in CSR mode (Controlled Shear Rate)

All of the samples exhibit a strongly pronounced yield point. The visually sensorial testing, moreover, reflected thixotropic or structurally viscous behavior on the part of the samples.

Optical Microscopy Images

In order to obtain an impression of the degree of agglomeration and the quality of the dispersion, micrographs were produced of the different dispersions. Pictured below is a selection of samples with particularly good and particularly poor dispersion.

Figure 5:
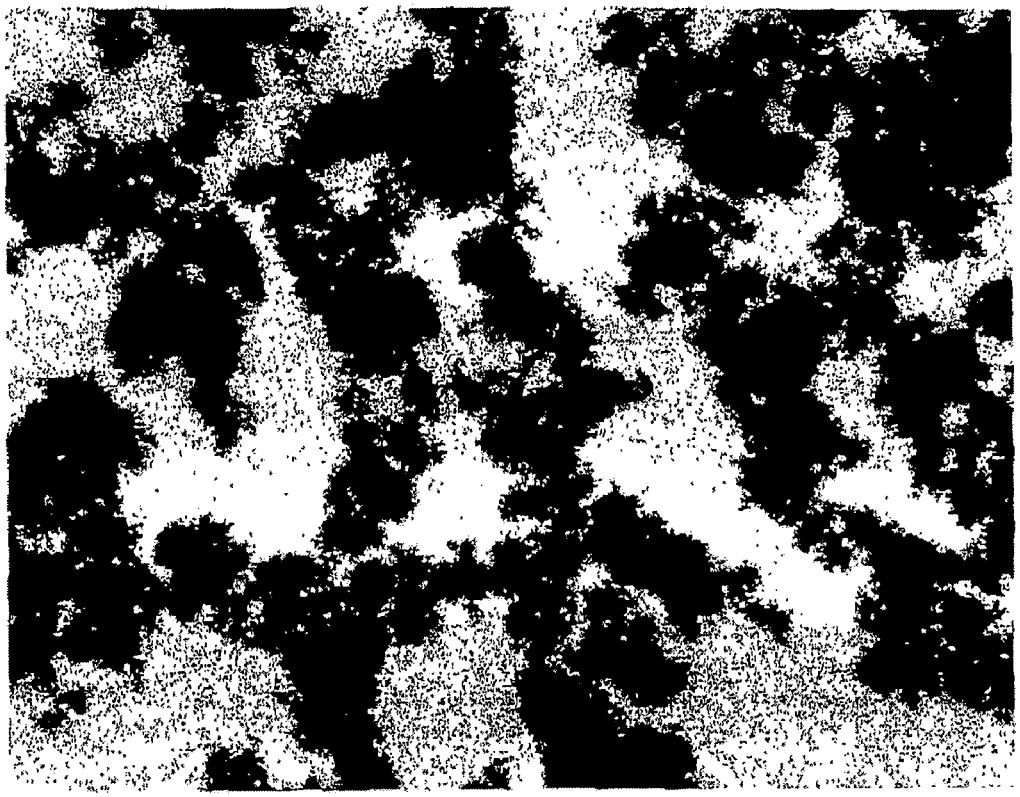
FIG. 5 shows a ten-times magnification of a 0.1% dispersion of CNTs in PMA after ultrasound treatment without dispersant (very poor dispersion, large agglomerates).

FIG. 5 shows a ten-times magnification of a 0.1% dispersion of CNTs in PMA after ultrasound treatment without dispersant (very poor dispersion, large agglomerates).

Figure 6:
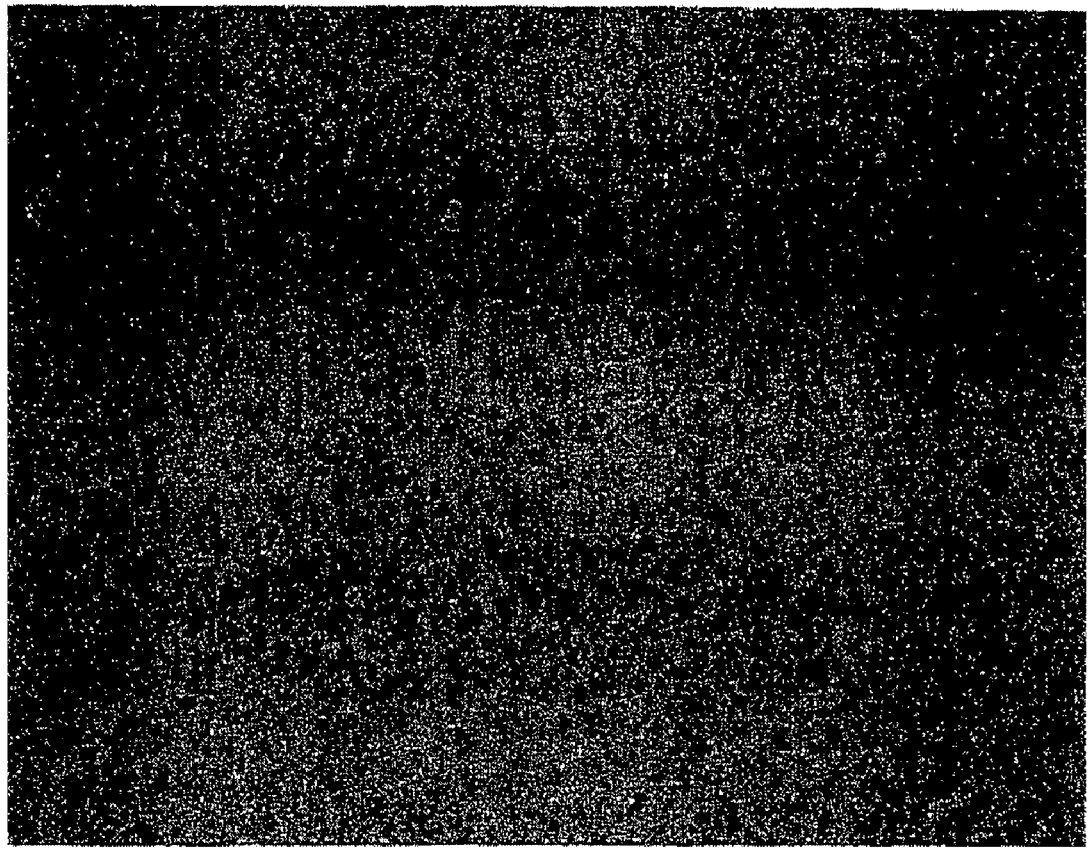
FIG. 6 shows a ten-times magnification of a 0.1% dispersion of CNTs in PMA after ultrasound treatment in the presence of 50% dispersant (DISP-II) (good and stable dispersion, few agglomerates, significantly homogeneous).

FIG. 6 shows a ten-times magnification of a 0.1% dispersion of CNTs in PMA after ultrasound treatment in the presence of 50% dispersant (DISP-II) (good and stable dispersion, few agglomerates, significantly homogeneous).

Figure 7:
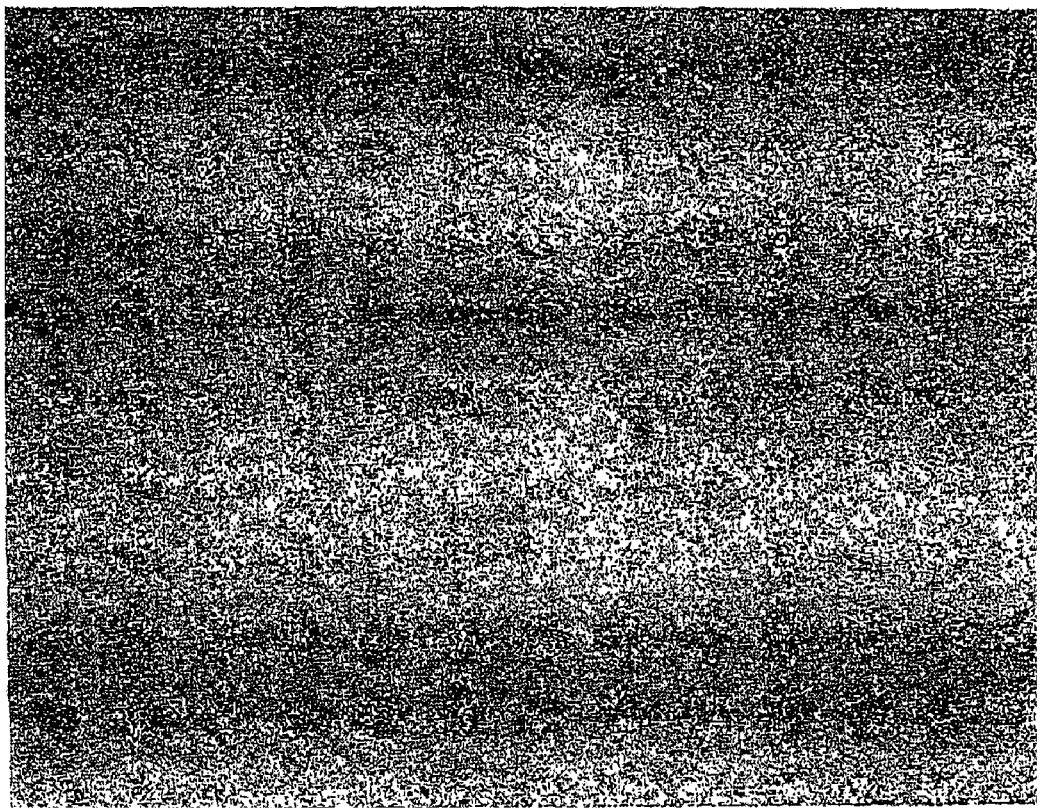
FIG. 7 shows a ten-times magnification of a 0.1% dispersion of CNTs in PMA after ultrasound treatment in the presence of 100% dispersant (DISP-I) (very good and very homogeneous dispersion, no large agglomerates any more, stable).

FIG. 7 shows a ten-times magnification of a 0.1% dispersion of CNTs in PMA after ultrasound treatment in the presence of 100% dispersant (DISP-I) (very good and very homogeneous dispersion, no large agglomerates any more, stable).

Stabilities

The dispersions prepared in accordance with the invention have now been stable at room temperature for about 4 months, and are not exhibiting any sedimentation of the CNTs. Even dispersions with CNT contents of 3% or more are indeed thixotropic but show no sedimentation of the CNTs over a relatively long time period. Dispersions prepared in other ways, in contrast, frequently exhibit complete phase separation after just hours.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A method of dispersing carbon nanotubes (CNTs) in a continuous phase as the dispersion medium, wherein:
    (i) first, before the dispersing operation, a method step is carried out in which the carbon nanotubes (CNTs) are contacted and homogenized with a continuous phase and at least one polymeric dispersant, wherein the polymeric dispersant is used in amounts of 25% to 400% by weight, based on the carbon nanotubes (CNTs) to be dispersed wherein the polymeric dispersant is based on a functionalized polymer having a number-average molecular mass of at least 2000 g/mol; and (ii) subsequently the carbon nanotubes (CNTs) are dispersed in the continuous phase in the presence of the polymeric dispersant, with introduction of an energy input sufficient for dispersing, in amounts of $1\times10^{-1}$% to 30% by weight, based on the resulting dispersion, the amount of energy introduced, calculated as energy introduced per unit quantity of carbon nanotubes (CNTs) to be dispersed, being 15 000 to 100 000 kJ/kg wherein the dispersing operation is carried out without prior pretreatment of the carbon nanotubes (CNTs) to be dispersed.

2. The method of claim 1, wherein the carbon nanotubes (CNTs) are dispersed in amounts of $1\times10^{-1}$% to 20% by weight, based on the resulting dispersion, in the continuous phase.

3. The method of claim 1, wherein the carbon nanotubes (CNTs) are dispersed in amounts of $1\times10^{-1}$% to 5% by weight, based on the resulting dispersion, in the continuous phase.

4. The method of claim 1, wherein the method is carried out over a period of 0.01 to 30 minutes.

5. The method of claim 1, wherein the energy input takes place by means of ultrasound treatment.

6. The method of claim 1, wherein the amount of energy introduced, calculated as energy introduced per unit quantity of carbon nanotubes (CNTs) to be dispersed, is 25 000 to 50 000 kJ/kg.

7. The method of claim 1, wherein the dispersing operation is carried out without prior oxidation, chemical treatment, thermal treatment, polarization or halogenation.

8. The method of claim 1, wherein:
the carbon nanotubes (CNTs) used are selected from single-wall carbon nanotubes (SWCNTs or SWNTs) or multiwall carbon nanotubes (MWCNTs or MWNTs),
the carbon nanotubes (CNTs) used have average internal diameters of 0.4 to 50 nm,
the carbon nanotubes (CNTs) used have average external diameters of 1 to 60 nm,
the carbon nanotubes (CNTs) used have average lengths of 0.01 to 1000 µm,
the carbon nanotubes (CNTs) used have a tensile strength per carbon nanotube of at least 1 GPa,
the carbon nanotubes (CNTs) used have an elasticity modulus per carbon nanotube of at least 0.1 TPa,
the carbon nanotube (CNTs) used have a thermal conductivity of at least 500 W/mK,
the carbon nanotubes (CNTs) used have an electrical conductivity of at least $10^3$ S/cm,
the carbon nanotubes (CNTs) used have a bulk density in the range from 0.01 to 0.3 g/cm$^3$.

9. The method of claim 1, wherein an aqueous-, organic- or aqueous organic-based dispersion medium is used as continuous phase.

10. The method of claim 1, wherein a dispersion medium which is present in the liquid aggregate state under atmospheric pressure (101.325 kPa) and in a temperature range of 10 to 100° C. is used as continuous phase.

11. The method of claim 1, wherein the dispersion medium is selected from the group of (i) alcohols; (ii) ether alcohols; (iii) hydrocarbons; (iv) ethers; (v) carboxylic esters; (vi) ether esters; (vii) lactones; (viii) plasticizers; (ix) aldehydes and ketones; (x) acid amides; (xi) N-methylpyrrolidone; and mixtures thereof.

12. The method of claim 1, wherein the polymeric dispersant is selected from the group consisting of polymers and copolymers having functional groups and/or groups with pigment affinity, alkylammonium salts of polymers and copolymers, polymers and copolymers having acidic groups, comb copolymers and block copolymers, block copolymers having groups with pigment affinity, block copolymers having basic groups with pigment affinity, modified or unmodified acrylate block copolymers, modified or unmodified polyurethanes, modified or unmodified polyamines and their salts, phosphoric esters, ethoxylates, polymers and copolymers having fatty acid radicals, modified or unmodified polyacrylates, transesterified polyacrylates, modified or unmodified polyesters, acid-functional polyesters, polyphosphates, and mixtures thereof.

13. A method of dispersing carbon nanotubes (CNTs) in a continuous phase as the dispersion medium, wherein:
(i) first, before the dispersing operation, a method step is carried out in which the carbon nanotubes (CNTs) are contacted and homogenized with a continuous phase and at least one polymeric dispersant,
wherein the polymeric dispersant is based on a functionalized polymer having a number-average molecular mass of at least 2000 g/mol, and
wherein the polymeric dispersant is selected from the group consisting of polymers and copolymers having functional groups and/or groups with pigment affinity, alkylammounium salts of polymers and copolymers, polymers and copolymers having acidic groups, comb copolymers and block copolymers, block copolymers having groups with pigment affinity, block copolymers having basic groups with pigment affinity, modified or unmodified acrylate block copolymers, modified or unmodified polyurethanes, modified or unmodified polyamines and their salts, phosphoric esters, ethoxylates, polymers and copolymers having fatty acid radicals, modified or unmodified polyacrylates, transesterified polyacrylates, modified or unmodified polyesters, acid-functional polyesters, polyphosphates, and mixtures thereof, and
wherein the polymeric dispersant is used in amounts of 25% to 400% by weight, based on the carbon nonotubes (CNTs) to be dispersed; and
(ii) subsequently the carbon nanotubes (CNTs) are dispersed in the continuous phase in the presence of the dispersant, with introduction of an energy input sufficient for dispersing, in amounts of $1\times10^{-1}$% to 30% by weight, based on the resulting dispersion, the amount of energy introduced, calculated as energy introduced per unit quantity of carbon nanotubes (CNTs) to be dispersed, being 15 000 to 100 000 kJ/kg wherein the dispersing operation is carried out without prior pretreatment of the carbon nanotubes (CNTs) to be dispersed.

* * * * *